US007061489B2

(12) United States Patent
Snyder et al.

(10) Patent No.: US 7,061,489 B2
(45) Date of Patent: Jun. 13, 2006

(54) PRECOMPUTED RADIANCE TRANSFER FOR RENDERING OBJECTS

(75) Inventors: John Michael Snyder, Redmond, WA (US); Peter-Pike J. Sloan, Bellevue, WA (US); Xinguo Liu, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/951,272

(22) Filed: Sep. 27, 2004

(65) Prior Publication Data

US 2005/0104883 A1  May 19, 2005

Related U.S. Application Data

(63) Continuation-in-part of application No. 10/641,472, filed on Aug. 15, 2003.

(51) Int. Cl.
*G06T 15/50* (2006.01)

(52) U.S. Cl. ...................................................... 345/426
(58) Field of Classification Search ................. 345/426
See application file for complete search history.

(56) References Cited

U.S. PATENT DOCUMENTS 6,919,889 B1 * 7/2005 Grzeszczuk et al. ........ 345/420

OTHER PUBLICATIONS

Jan Kautz, Michael McCool, "Interactive Rendering with Arbitrary BRDFs using Separable Approximations," Jun. 21, 1999, in Proceedings of the 10th Eurographics Workshop on Rendering.*

Jan Kautz, Peter-Pike Sloan, John Snyder, "Fast, Arbitrary BRDF Shading for Low-Frequency Lighting Using Spherical Harmonics," Jun. 26, 2002, in Proceedings of the 13th Eurographics Workshop on Rendering.*

Peter-Pike Sloan, Jan Kautz, John Snyder, "Precomputed Radiance Transfer for Real-Time Rendering in Dynamic, Low-Frequency Lighting Environment," Jul. 21, 2002, in Proceedings ACM SIGGRAPH 02, p. 527-536.*

Ren Ng, Ravi Ramamoorthi, Pat Hanrahan, "All-frequency Shadows Using Non-linear Wavelet Lighting Approximation," Jul. 2003, ACM Transactions on Graphics (TOG), v.22 n.3.*

Hendrik P. A. Lensch, Jan Kautz, Michael Gosele, Wolfgang Heidrich, and Hans-Peter Seidel, "Image-Based Reconstruction of Spatially Varying Materials," 2001, Rendering Techniques, p. 104-115.*

Nandakishore Kambhatla, Todd K. Leen, "Dimension Reduction by Local Principal Component Analysis," 1997, Neural Computation, v. 9, p. 1493-1516.*

* cited by examiner

*Primary Examiner*—Ulka Chauhan
*Assistant Examiner*—Jason M. Repko
(74) *Attorney, Agent, or Firm*—Microsoft Corporation

(57) ABSTRACT

The described systems and methods are directed at interactively rendering graphics using precomputed radiance transfer (PRT). A reflectance matrix that represents the reflectance of a particular object to be rendered is determined. Source lighting associated with the object is represented using basis functions. The reflectance matrix is factored into view and light components. A raw transfer matrix is determined based, in part, from the factored reflectance matrix and the source lighting. The raw transfer matrix is partitioned to obtain transfer matrices, which are used to render the object. The described systems and methods are capable of rendering glossy objects with well-defined shadows.

42 Claims, 6 Drawing Sheets

PRECOMPUTED RADIANCE TRANSFER FOR RENDERING OBJECTS

CROSS-REFERENCE TO RELATED APPLICATION(S)

This application is a continuation-in-part of and claims the benefits of U.S. patent application Ser. No. 10/641,472, filed Aug. 15, 2003, titled "CLUSTERED PRINCIPAL COMPONENTS FOR PRECOMPUTED RADIANCE TRANSFER", the contents of which are hereby incorporated by reference.

BACKGROUND OF THE INVENTION

Developers are constantly trying to create better ways to model objects to meet the continuing demands from users for more realistic graphics. The realism of rendered graphics often depends on the accuracy of the illumination effects associated with the objects that are being modeled. These illumination effects typically require intensive processing, especially for real-time graphics rendering.

Many of the currently available rendering methods do not effectively account for illumination effects. For example, one existing method uses a low-order spherical harmonic basis for calculating the illumination effects. Because this low-order method only uses a limited number of lighting coefficients, the method is limited to low-frequency lighting and produces only soft shadows for the rendered objects. Another existing method uses single-row (scalar output) transfer matrices to render graphics. This method with scalar output can only effectively render diffuse objects or glossy objects seen from a fixed view.

A graphics rendering technique that can overcome the above-identified deficiencies continues to elude those skilled in the art.

SUMMARY OF THE INVENTION

The described systems and methods are directed at interactively rendering graphics using precomputed radiance transfer (PRT). A reflectance matrix that represents the reflectance of a particular object to be rendered is determined. Source lighting associated with the object is represented using basis functions. The reflectance matrix is factored into view and light components. A raw transfer matrix is determined based, in part, from the factored reflectance matrix and the source lighting. The raw transfer matrix is partitioned to obtain transfer matrices, which are used to render the object. The described systems and methods are capable of rendering glossy objects with well-defined shadows.

DETAILED DESCRIPTION OF THE DRAWINGS

A. Formulation of the Factored PRT Signal

Figure 1:
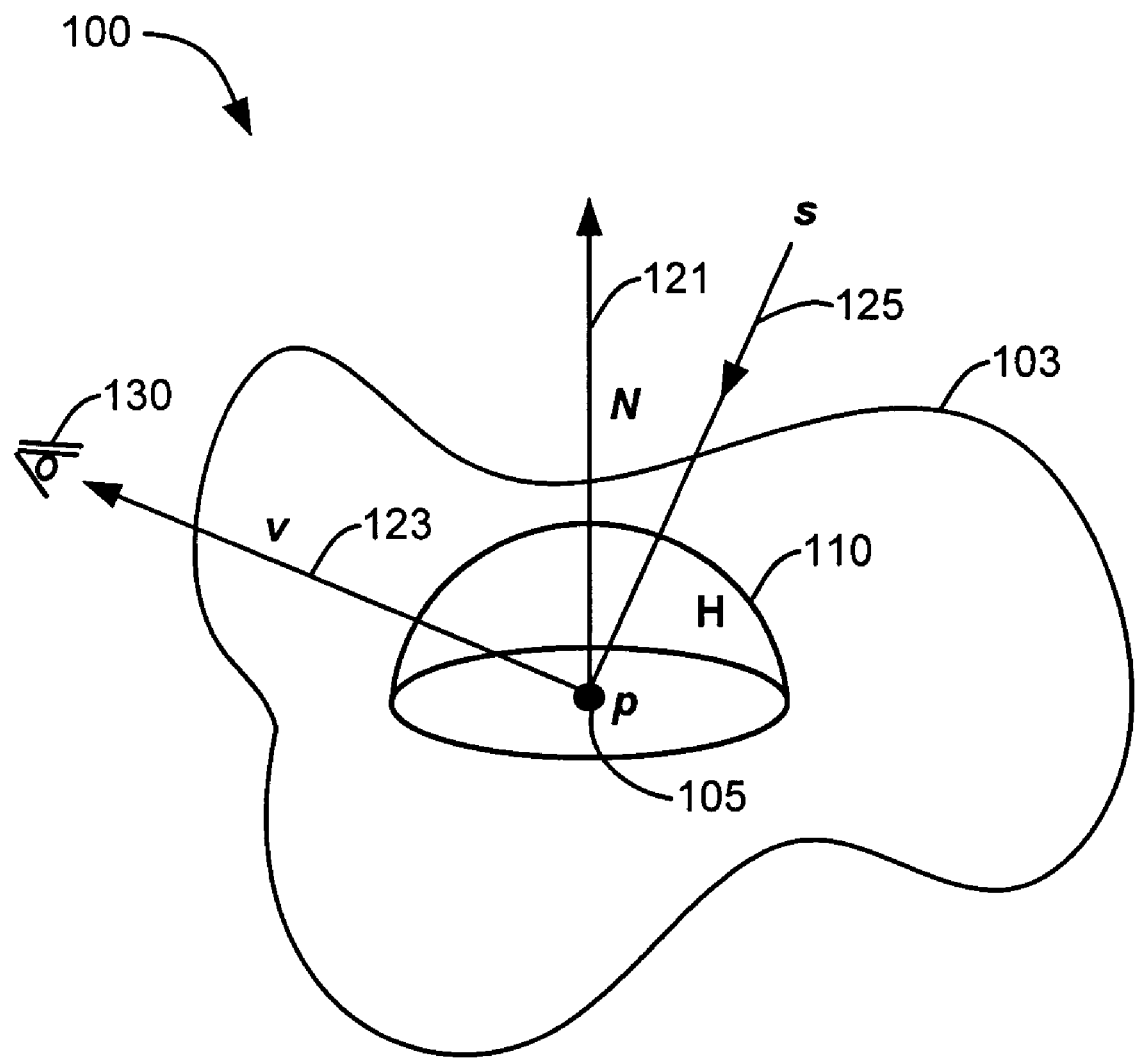
FIG. 1 shows an example convention for representing illumination effects.

FIG. 1 shows an example convention 100 for representing illumination effects. As illustrated in FIG. 1, illumination effects for object 103 at a surface point 105 (also shown as p) may be represented in conjunction with an infinitesimal hemisphere 110. The base surface of hemisphere 110 (also shown as H) is situated on the surface of object 103 at point 105, represented by normal vector 121. Source radiance 125 (also shown as vector s) passes through hemisphere 110 and reflects off object 103 at surface point 105. Viewing the reflected radiance in a particular viewing position 130, the exit radiance 123 is represented by vector v.

Example convention 100 may also include additional parameters. For example, self-shadowing, inter-reflection, and subsurface scattering may be included to modify the exit radiance 123.

In the following discussion, the term "global frame" is used to describe a coordinate frame in which the source lighting is represented and which is shared by all vertices on the object. The term "local frame" is used to describe a coordinate frame determined by the normal and tangent directions at each vertex p of an object. Lower-case letters denote scalars or low-dimensional (2 or 3) vectors, capital letters denote high-dimensional vectors or matrices.

Referencing example convention 100 in FIG. 1, shading at point p with view vector v may be given by an integral over the hemisphere H of lighting directions s in the local frame:

$$g_p(v) = \int_{s \in H} f(v,s) t_p(s) ds \qquad (1)$$

$t_p(s)$ is the transferred incident radiance function. This function represents the radiance from the source lighting that arrives at p after including transport effects like self-shadowing from the object. $t_p(s)$ may also rotate the lighting from a global to a local frame. $t_p(s)$ may be configured as a linear operator on the source lighting, $l(s)$ and may be denoted by $$t_p(s) = t_p[l(s)] \qquad (2)$$

The reflectance of the object as a function of illumination geometry and viewing geometry may be represented by a bidirectional reflectance distribution function (BRDF). The BRDF may depend on various parameters, such as the characteristics of the source light, the structural and optical properties of the surface, shadow-casting, multiple scattering, mutual shadowing, transmission, reflection, absorption, emission by surface elements, facet orientation distribution and facet density.

A BRDF production function may be defined as $f(v,s) = b(v,s) s_z$ where $b(v,s)$ is the BRDF and $s_z$ is the cosine factor (normal component of the incident radiance direction s).

Figure 2:
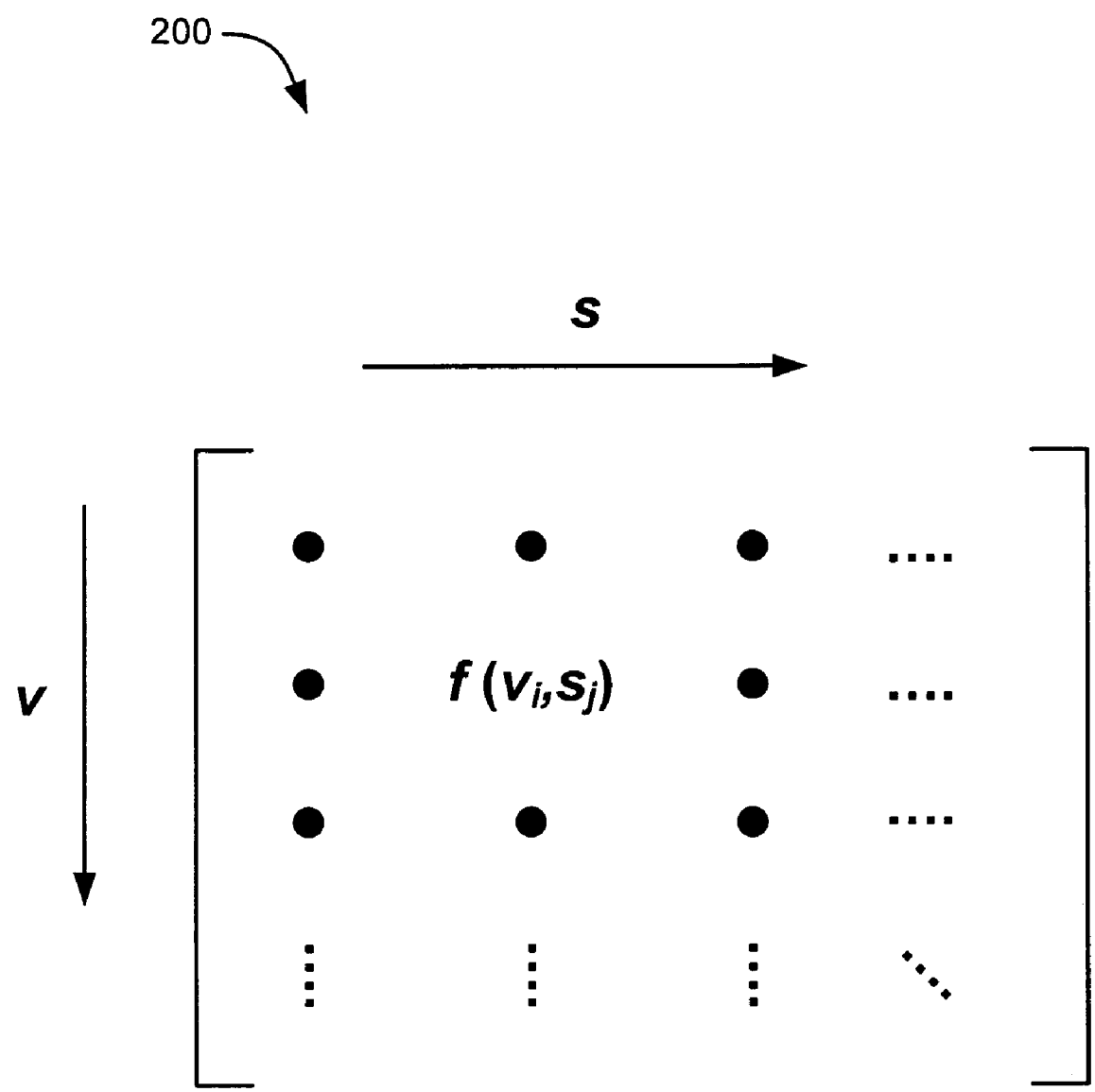
FIG. 2 illustrates an example matrix of a bidirectional reflectance distribution function (BRDF) product function after being processed.

FIG. 2 illustrates an example matrix 200 of a BRDF product function after being processed. The directions v and s of the BRDF may be parameterized using a parabolic map. The BRDF product function $f(v,s)$ may be sampled on a grid for both v and s. Any grid size may be used. A 32×32 grid can be used to yield good results.

The BRDF product function may be supersampled to avoid missing the specular peaks. Any factor may be used. A factor of 16×16 and average down can be used to produce good results. The filtered samples may be arranged as example matrix 200.

$f$ may be factored via $$f(v,s) = G(v) \cdot F(s) \qquad (3)$$

where G(v) and F(s) are m-dimensional vector functions purely of view direction v and light direction s, respectively. In FIG. 2, the matrix of samples may be factored by applying singular value decomposition and keeping the most significant terms. BRDF factorization will be discussed in more detail in Section B below.

A precomputed radiance transfer (PRT) may be used to capture how an object shadows, scatters, and reflects light. PRT includes recording a transfer matrix, respectively, over multiple surface points. For example, the transfer matrix may be used at run-time to transform a vector of spherical harmonic coefficients representing lighting into exit radiance. PRT surface signal may be given by the following linear operator (having m outputs) at each point p $$M_p[l(s)] = \int_{s \in H} F(s) t_p[l(s)] ds \quad (4)$$

Because $t_p$ is a linear operator, $M_p$ may also depend linearly on the source lighting function, $l(s)$. Any linear basis for source lighting, such as the spherical harmonic basis, wavelet basis over cube map faces, or a directional basis, may represent $l(s)$ via $$l(s) = \sum_{i=1}^{n_L} L_i l_i(s) \quad (5)$$

where $l_i(s)$ is the i-th lighting basis function and $L_i$ is its coefficient. The lighting may be represented with a cube map with a significant number ($n_L$) of coefficients. Any number of coefficients may be used. In one example, $n_L = 6 \times 32 \times 32 = 6,144$ yields good results. Typically, x to y number of coefficient may be used.

Using the cube map enables the use of more coefficients to represent the source lighting when rendering an object. Unlike other approaches, the described technique can handle high frequency lighting and does not limit the source to only low frequency lighting. For example, the described technique is capable of handling lighting that is represented by more than 1000 basis functions (i.e. high frequency lighting). In one implementation, the described systems and methods are configured to render glossy objects with global effects due to all-frequency lighting.

In this lighting basis, the PRT signal may be represented as a $m \times n_L$ transfer matrix at each point, $M_p$, a component of which is given by $$(M_p)_{ij} = \int_{s \in H} F_i(s) t_p[l_j(s)] ds \quad (6)$$

where $t_p[l_j(s)]$ is a scalar spherical function representing transferred incident radiance from the j-th lighting basis function, $l_j(s)$. $M_p$'s rows represent contribution to one component of transferred incident radiance corresponding to $F_i(s)$. Its columns represent the response to one lighting basis function, $l_j(s)$.

Combining equations (1–6), the shading result may given by $$g_p(v) = G^T(v) M_p L = G(v) \cdot (M_p L) \quad (7)$$

where $G^T(v)$ is the m-dimensional row vector formed by transposing the column-vector BRDF factor G(v), $M_p$ is the transfer matrix at p, and L is the vector of lighting coefficients.

B. BRDF Factorization

To factorize a BRDF, a matrix Q is formed. Matrix Q may includes various components, such as $Q_{ij} = f(v_i, s_j)$, with $n_v$ view samples, $v_i$, and $n_s$ light samples, $s_j$. The viewing and lighting directions may be parameterized using a parabolic map. Any number of sampled directions for viewing and lighting may be used. For example, $n_v = n_s = 32 \times 32 = 1024$ sampled directions for both viewing and lighting may be used to produce good results.

Singular value decomposition (SVD) may be performed on the matrix Q. The largest m singular values may be set to zero in the factorization process. After SVD has been performed, matrix Q may be represented by $$Q_{ij} \approx \sum_{k=1}^{m} G_{ik} \sigma_k F_{kj} \quad (8)$$

Absorbing a square root of the diagonal matrix formed by the singular values $\sigma_k$ into both the left and right factors, the two functions G(v) and F(s) may be determined via $$f(v_i, s_j) \approx \sum_{k=1}^{m} G_k(v_i) F_k(s_j) = G(v_i) \cdot F(s_j) \quad (9)$$

Continuous functions may be resulted from interpolation between sample points in the parabolic parameterization space.

Generally, a specular BRDF may have high values when the view direction aligns with the reflected light direction and drops off rapidly at nearby samples. The sampled view and light directions may be located on a regular grid so that these features may easily be missed.

To avoid aliasing, each pair of view/light samples may be supersampled by a factor. Any factor may be used, such as 16×16 and the like. The limited sampling may have the effect of smoothing highly specular BRDF's.

The cosine factor may be included in the BRDF factorization. Including the cosine factor may attenuate the function's values, making function easier to approximate. In practice, the nonlinear operation of clamping values of $f$ bigger than 3 before performing the SVD may provide more visual accuracy. Also, good accuracy may be achieved with only a few dimensions. For example, using as few as m=10 dimensions may produce less than a 3% error, which is defined by sum of squared differences divided by total sum of squares over BRDF samples.

C. PRT Computation

The precomputation of the PRT signal $M_p$ is described below. For simplicity of discussion, the described implementation handles direct shadowing effects and but ignores inter-reflection. However, inter-reflection can be incorporated without modifying the basic structure of the implementation.

At each mesh vertex p, a visibility map, $q_p(s_j)$, is computed at directional samples $s_j$, which returns 0 if p is shadowed in the direction $s_j$ and 1 if it is unshadowed. A cube map may be used in a global coordinate system to parameterize the directions $s_j$. Directions below the hemisphere around p's normal may be ignored. $q_p$ 4×4 may be supersampled to yield a 6×128×128 cube map.

From the visibility map, a raw transfer matrix signal $\tilde{M}_p$ (also referred to as a raw PRT matrix) that integrates against the BRDF basis functions $F_i(s)$ may be computed. Unlike the final transfer matrix, the raw transfer matrix may use a directional lighting basis. This raw transfer matrix may be given by the following integral over a small cone of directions in the global frame:

$$(\tilde{M}_p)_{ij} = \int_{s \in C(s_j)} d_{s_j}(s) q_p(s) F_i(R_p(s)) ds \quad (10)$$

where $C(s_j)$ is the cone of directions within one cube map texel of the direction $s_j$, $d_{s_j}(s)$ is the bilinear basis function on the cube map centered at the sample $s_j$, and $R_p$ rotates the direction s from the global frame to the local frame.

In one implementation, the raw transfer signal $\tilde{M}_p$ may have $m \times n_L = 61{,}440$ dimensions at each vertex, which may require several gigabytes of storage for typical models in single precision. $\tilde{M}_p$ may be compressed by applying wavelet transform over the light dimensions, quantizing to a reasonable precision, and exploiting sparsity. This compression technique may reduce data by as much as a factor of 10 or more.

The lighting basis may be partitioned into segments using a subdivision of the cube map faces. Any number of segment and subdivision may be used. For example, partitioning the lighting basis into 24 segments using a 2×2 subdivision yields good results.

The dimension of a transfer segment depends on how many segments were used. For example, for a 24 segment partition, each resulting transfer segment has $n_T = m \times (n_L/24) = 2560$ dimensions, corresponding to columns in the transfer matrix that respond to that lighting segment.

Figure 3:
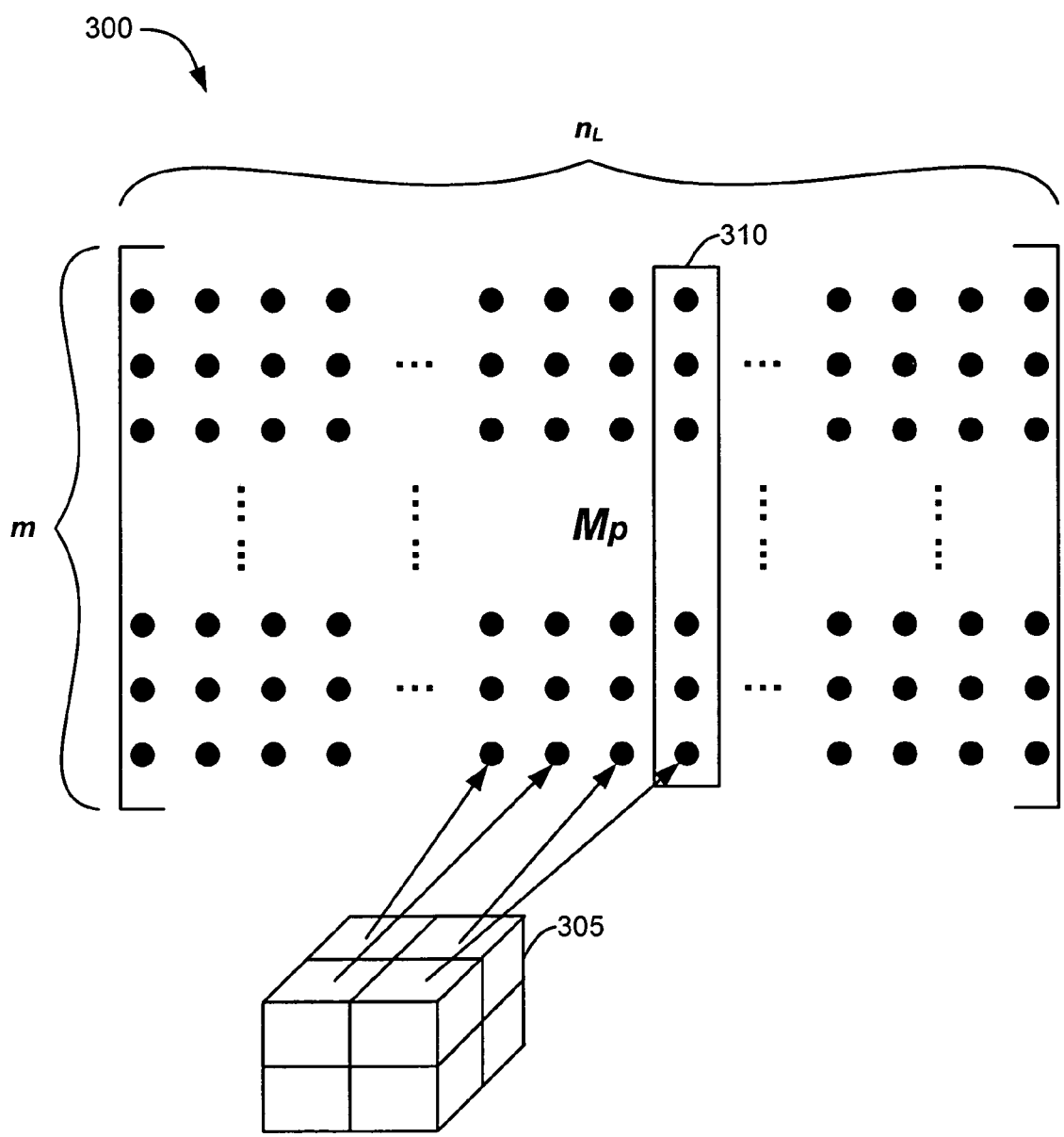
FIG. 3 illustrates the partitioning of an example raw precomputed radiance transfer (PRT) matrix into segments.

FIG. 3 illustrates the partitioning of an example raw precomputed radiance transfer (PRT) matrix 300 (e.g. $\tilde{M}_p$) into segments. Each row of raw PRT matrix 300 represents contribution to one component of output radiance. Each column represents response to one lighting basis function. Raw transfer matrix signal 300 may have any dimension $m \times n_L$. A light basis function in the raw PRT matrix 300 may correspond to a pixel in a cube map.

The columns of raw PRT matrix 300 may be partitioned into multiple segments, such as segment 310. Each segment may correspond to a portion of a cube face. FIG. 3 shows one example way to partition raw PRT matrix 300. In this example, each segment corresponds to a quarter of the face of a cube 305. For illustrative purposes, assume that raw PRT matrix 300 includes 10 rows and is partitioned into 24 segments. Further assume that each segment corresponds to a 16×16 set of samples. In this case, raw PRT matrix 300 includes 10×256 matrix components per segment. The particular manner in which raw PRT matrix 300 may be partitioned as discussed above is only included for discussion purposes. In practice, any raw PRT matrix 300 may be partitioned as any number of segments.

Partitioning raw PRT matrix 300 is advantageous because radiance transfer from a smaller light source tends to have more spatial coherence. Partitioning also reduces signal dimensionality to an acceptable size for clustered principal component analysis (CPCA). It may not be practical to run CPCA directly on data of gigantic dimension.

The segments of the lighting basis may be compressed using CPCA. CPCA partitions multiple samples into fewer clusters, each cluster approximating the signal as an affine subspace. CPCA may reduce a high-dimensional transfer signal to a low-dimensional set of per-point weights on a per-cluster set of representative matrices. Compressing transfer segment using CPCA will be discussed below in Section D.

In one implementation, a Haar wavelet transform may be applied to the representative matrices (eigen-matrices) in each cluster and quantize them to 16 bits of precision, followed by a lossless sparsity coding. The per-vertex weights may be quantized. For example, a 16 bit quantization may provide a compression factor of 77 (1.3% of raw size) on a particular glossy object.

To exploit sparsity in the quantized representative transfer matrices, a normalized, non-standard Haar transform may be applied. For example, a 16-bit quantization may be applied. A matrix may be formed where each row is one representative transfer matrix from the clusters. This matrix may be blocked into groups of 256 rows. A sparse-matrix encoding may be performed over columns (i.e., over single components of the representatives). Thus, a row index and 16-bit quantized value may be stored for components that are non-zero.

D. PRT Compression Using CPCA

1. CPCA Representation

The technique of CPCA may be applied to the separate signals consisting of a $n_T$ dimensional transfer segment at each surface vertex. In the discussion below, the signal will continue to be denoted as $M_p$. However, it is to be understood that the signal below is only a subset of the columns of the matrix in equation (6). Because CPCA encoding may be slow and quadratic in the signal dimension $n_T$, dividing the signal into fewer independent components (e.g. 24) makes the computation faster.

CPCA approximates a transfer segment via the following linear combination in each cluster $$M_p \approx \sum_{i=1}^{n} w_p^i M^i \quad (11)$$

where n is the number of representative matrices per cluster, $w_p^i$ are n scalar weights that vary spatially, and $M^i$ are n representative matrices which are constants for each cluster. An alternative formulation may be used that includes an affine combination, which includes unweighted cluster mean. A good approximation for interactive rendering may be achieved using n=16.

2. CPCA Compression Analysis

Lighting segments above the normal's hemisphere contribute to shading. Segments below it can be ignored. At any vertex, a portion of the segment may be below the normal's hemisphere. In one implementation, at least 4 out of 24 segments are below the normal's hemisphere. On average, approximately 8 out of 24 may be below the normal's hemisphere. Thus, a given transfer segment may be nonzero for only $\omega = \frac{2}{3}$ of all vertices, even without any shadowing. Vertices whose shading ignores a particular segment may be culled before beginning the CPCA encoding to reduce the size of the signal. Extensive self-shadowing on the object further decreases $\omega$, which reduces the signal's size even more.

To analyze compression after elimination of entirely zero transfer segments, let $n_C$ be the number of vertices in a cluster. The size of the compressed representation in a single cluster is $n_T n$ to store the representative transfer segments and $n_C n$ to store the per-point weights. The uncompressed size of the cluster data is $n_C n_T$. This provides a compression ratio r defined by $$r = \frac{n_C n_T}{n(n_C + n_T)} \quad (12)$$

As an example, assume that a single transfer segment over a model with 16,000 vertices is to be encoded. Also, assume that $\omega=\frac{2}{3}$ and that only 10,667 of these vertices have a nonzero transfer segment. Using 64 clusters in each segment (64×24 total clusters) yields $n_C=167$ average vertices per cluster, and a compression ratio estimate of $r\approx 9.8$. This is only an estimate because CPCA allows $n_C$ to vary over clusters. Only its average can be fixed. The total compressed size is roughly $\omega/r=6.8\%$ of the raw signal, including both CPCA and elimination of zero transfer segments.

3. CPCA Encoding

To compute a CPCA approximation, an iterative method may be used. For example, the CPCA approximation may be computed using the "iterative CPCA" method described in Sloan P., Kautz J., Snyder J., "Precomputed Radiance Transfer For Real-Time Rendering in Dynamic, Low Frequency Lighting Environments," In Proc. Of SIGGRAPH '02 (2002), pp. 527–536 (hereinafter "Sloan"). The method alternates between classifying a point in the cluster providing the smallest approximation error followed by updating the cluster's representatives using an eigen-analysis over all points classified to it.

The total number of clusters may be determined by any manner. For example, the number of clusters may be determined by dividing the total number of nonzero transfer segments over all vertices by 200. This fixes an average $n_C=200$, which in turn targets a compression ratio of $r\approx 11.6$, not counting elimination of zero segments.

4. CPCA Rendering

Besides compression, another possible advantage of CPCA is that the representation may be rendered directly without the need to reconstruct the entire transfer matrix. The result may be a significant run-time speedup. For example, the approximate operator may be applied to the lighting to get an m-dimensional vector, $T_p$, representing transferred incident radiance with respect to the BRDF-specialized output basis F(s), via $$T_p = M_p L \approx \sum_{i=1}^{n} w_p^i (M^i L) = \sum_{i=1}^{n} w_p^i T^i \quad (13)$$

Instead of reconstructing a transfer matrix at each p and then applying it to the lighting, n matrix/vector multiplies may be computed in each cluster to obtain the $T^i$. Only n weighted combinations of these vectors at each vertex may have to be performed. From equation (7), the final shade may be given by the dot product of the m-dimensional vectors $T_p$ and $G(v)$.

CPCA may make the computation fairly insensitive to the number of lighting basis functions $n_L$. The per-vertex computation no longer depends on $n_L$, only on m and n. The per-cluster computation of the $T^i$ may be depend on $n_L$, but there are fewer clusters than vertices.

E. PRT Rendering

Any PRT rendering method may be used. For example, the PRT rendering method described in Sloan may be used. In one example PRT rendering method, the Sloan PRT rendering method is used but is applied to transfer matrices having a different input basis (Haar wavelets over cube map segments) and output basis (m-dimensional BRDF-specialized functions $F_i(s)$), rather than spherical harmonics. The example PRT rendering method may perform the following four steps:

1) Project the time-varying lighting environment onto the cube map, and then into the Haar basis over each segment to obtain the lighting vector L.

2) For each transfer segment, transform the lighting through each cluster's representatives to obtain the $T^i=M^i L$.

3) At each vertex, reconstruct the transferred radiance vector $T_p$ using a weighted combination of the $T^i$ in equation (13).

4) Compute the local view direction v and return the dot product of $G(v)$ with $T_p$.

The lighting vector L may have three color channels. The four steps described above may be performed for each color channel. Shadowed transfer may involve single-channel transfer matrices since all colors are occluded by the object in the same way. A 3-channel multiplication of the output of step 4 may be computed to provide surface color.

1. Lighting Projection

When transforming the 6×32×32 lighting cube map into the vector L, it may be advantageous to consider aliasing, especially with high dynamic range lighting which can contain very high frequencies. Supersampling the lighting 4×4 and decimating before computing the segmented Haar transform may reduce the aliasing problem.

Lighting truncation which eliminates unimportant lighting coefficients to make the vector L sparser may be another problem. One approach to address this problem is to include truncating coefficients with the lowest magnitude, magnitude weighted by spherical area, and magnitude weighted by average transfer response on the surface. Although truncation can accelerate performance, temporal artifacts may be generated when the lighting changes if significant lighting energy is truncated.

2. Per-Cluster Computation

Computing the $T^i=M^i L$ involves a sparse matrix/vector multiply on the CPU. Sparsity in L drives the computation. When truncation has been eliminated, the per-cluster and per-vertex computation times may be about equal.

3. Per-Vertex Computation

Though CPCA reduces per-vertex computation, this computation remains significant. For example, a computation may involve ω (average fraction of vertices having nonzero segment)×24 (segments)×n=16 (representatives)×m=10 (transfer output components)×3 (color channels) or 7680 multiplies per vertex for $\omega=\frac{2}{3}$. The computation may be linear in m and n. Thus, reducing the multiplies per vertex may speed up the computation. Also, when only the view is changed (i.e., the light remains fixed relative to the object), the method above may only recompute step 4.

Unlike the per-cluster computation, the per-vertex computation processes short, contiguously-accessed vectors; i.e., it is "dense" rather than sparse. This characteristic makes per-vertex computation suitable for Graphics Processing Unit (GPU) implementation. For example, the per-vertex computation may use a texture map for $G(v)$, interpolate $T_p$ over triangles, and do the dot product in step 4 in the pixel shader. This implementation may stream the m-dimensional transfer output signal $T_p$ to the graphics hardware.

F. Example Processes

Figure 4:
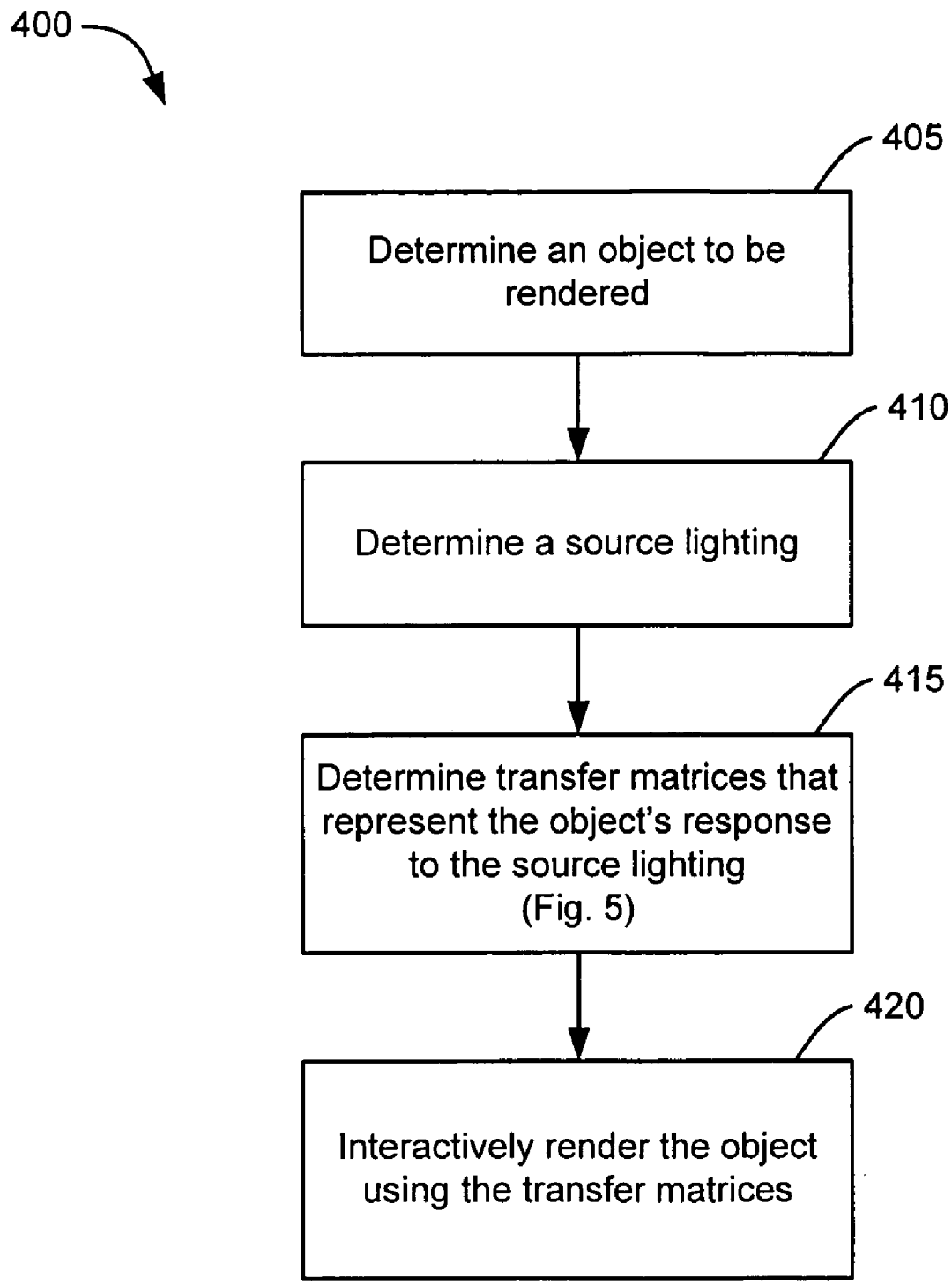
FIG. 4 shows an example process for rendering graphics.

FIG. 4 shows an example process 400 for rendering graphics. Process 400 may be implemented by one or more processing units (e.g. CPU's and GPU's) to interactively render an output based on the characteristics of the object and a given light condition. For example, process 400 may be applied to render a glossy object in real-time.

At block 405, an object to be rendered is determined. For example, the characteristics of the object, such as the object's dimensions, surface information, textural information, and other information associated with how the object responds to lighting, may be determined. At block 410, a source lighting on which the rendering is based is determined.

At block 415, transfer matrices that represent the object's response to the source lighting are determined. An example process for determining the transfer matrices will be discussed in conjunction with FIG. 5. Briefly stated, a BRDF is used to represent the reflectance of the object. The source lighting may represented by a cube map. A PRT associated with the BRDF and the source lighting is partitioned into segments. CPCA is applied to each segment to obtain the transfer matrices.

At block 420, the object is interactively rendered using the determined transfer matrices. Other processes may be executed in conjunction with process 400 to complete the rendering of the object.

Figure 5:
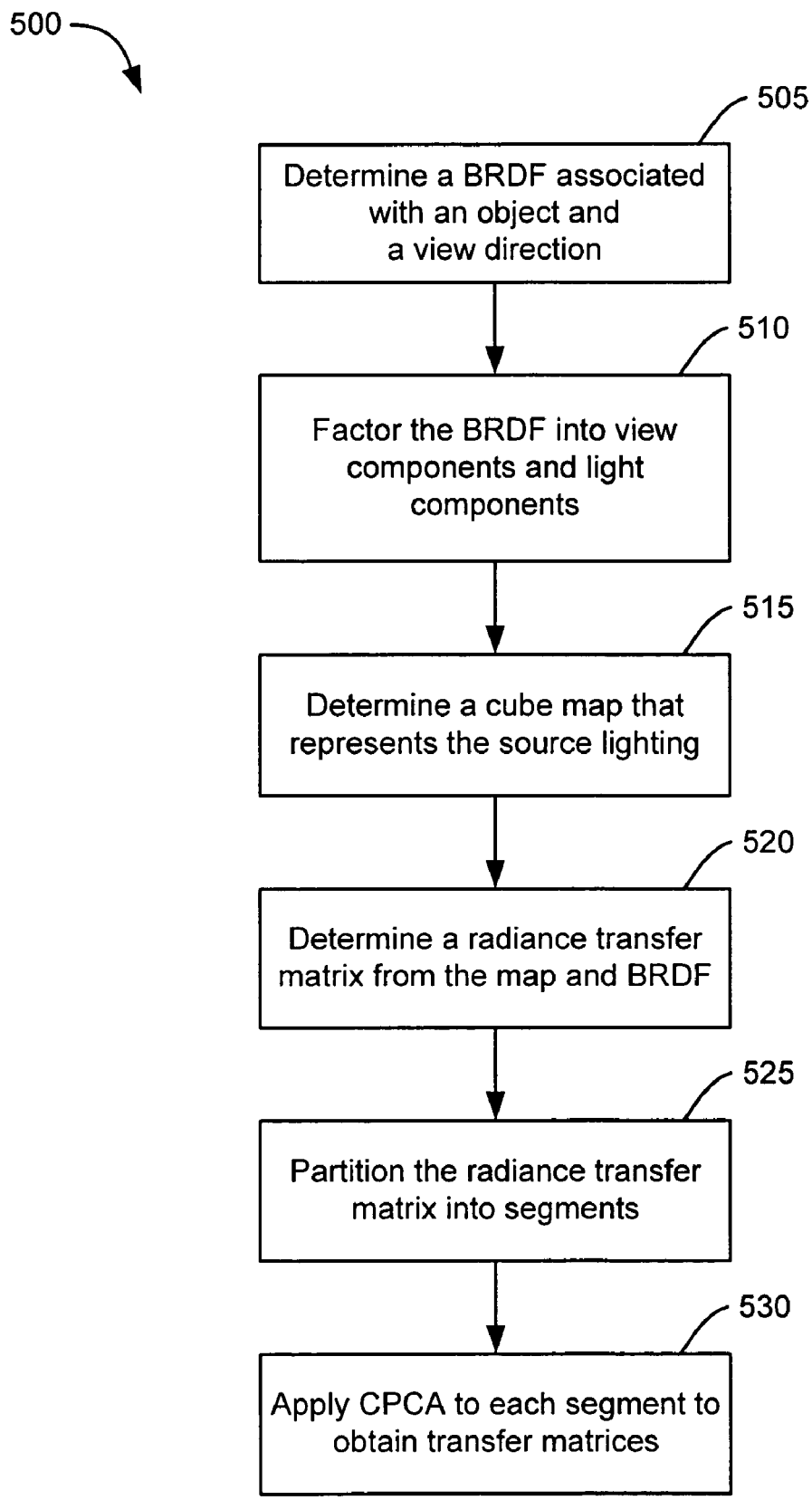
FIG. 5 shows an example process for determining transfer matrices associated with rendering an object.

FIG. 5 shows an example process 500 for determining transfer matrices associated with rendering an object. At block 505, a BRDF associated with an object and a view direction is determined. The BRDF represents the reflectance of the object based on the view direction.

At block 510, the BRDF is factored into view components and light components. For example, the BRDF may be factored into functions that depend on light directions and functions that depend on view directions. At block 515, a cube map that represents the source lighting is determined. The cube map enables the use of source lighting of various frequencies and does not limit the source to only low frequency lighting.

At block 520, a radiance transfer matrix is determined from the cube map and BRDF. The radiance transfer matrix may have a substantial number of dimensions because of the rich representation of lighting using the cube map. At block 525, the radiance transfer matrix is partitioned into segments. The partitioning reduces the number of dimensions so that the segments may be effectively compressed. At block 530, CPCA is applied to each segment to obtain transfer matrices, which may be used to interactively render the object.

G. Example Operating Environment

Figure 6:
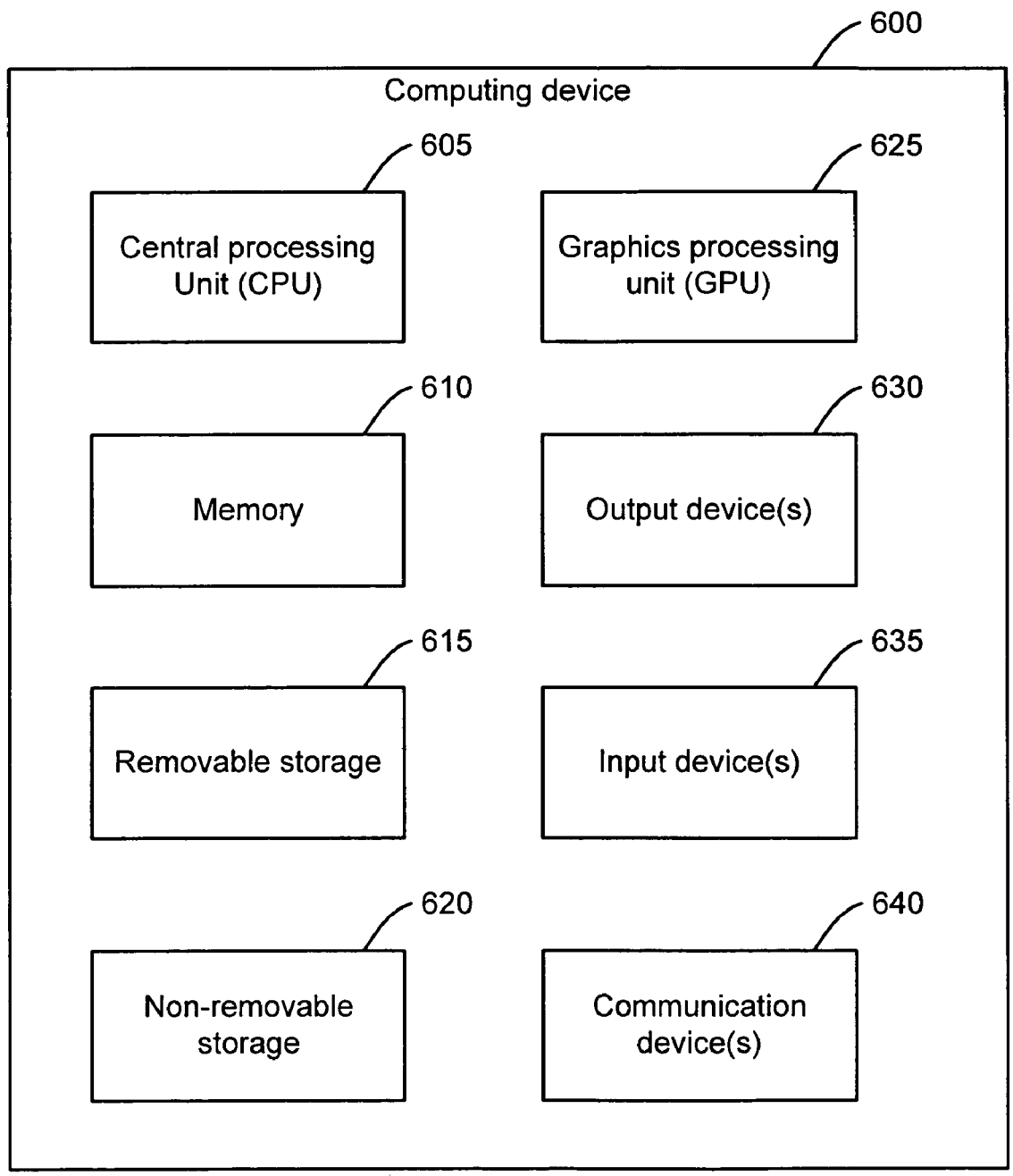
FIG. 6 shows an exemplary computer device for implementing the described systems and methods.

FIG. 6 shows an exemplary computer device 600 for implementing the described systems and methods. In its most basic configuration, computing device 600 typically includes at least one central processing unit (CPU) 605 and memory 610.

Depending on the exact configuration and type of computing device, memory 610 may be volatile (such as RAM), non-volatile (such as ROM, flash memory, etc.) or some combination of the two. Additionally, computing device 600 may also have additional features/functionality. For example, computing device 600 may include graphics processing unit (GPU) 625. The described methods may be executed in any manner by any processing unit in computing device 600. For example, the described process may be executed by both CPU 605 and GPU 625 in parallel.

Computing device 600 may also include additional storage (removable and/or non-removable) including, but not limited to, magnetic or optical disks or tape. Such additional storage is illustrated in FIG. 6 by removable storage 615 and non-removable storage 620. Computer storage media includes volatile and nonvolatile, removable and non-removable media implemented in any method or technology for storage of information such as computer readable instructions, data structures, program modules or other data. Memory 610, removable storage 615 and non-removable storage 620 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 640 that allow the device to communicate with other devices. Communications device(s) 640 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 635 such as keyboard, mouse, pen, voice input device, touch input device, etc. Output device(s) 630 such as a display, speakers, printer, etc. may also be included. All these devices are well know in the art and need not be discussed at length.

In view of the many possible embodiments to which the principles of described systems and methods may be applied, it should be recognized that the detailed embodiments discussed above are illustrative only and should not be taken as limiting the scope of our invention. Rather, we claim as our invention all such embodiments as may come within the scope and spirit of the following claims and equivalents thereto.

The invention claimed is:

1. A graphics processing method comprising:
   determining a reflectance function that represents reflectance of an object to be rendered;
   factoring the reflectance function into light components and view components;
   determining a transferred incidence radiance function that represents radiance from source lighting and that includes transport effects;
   generating a transfer matrix by integrating the factored light components of the reflectance function and the transferred incidence radiance function;
   determining lighting basis functions that represent source lighting;
   identifying lighting coefficients of the lighting basis functions;
   determining a shading function from the view components of the reflectance function, the generated transfer matrix, and lighting coefficients; and
   rendering the object based, at least in part, on the shading function.

2. The graphics processing method as recited in claim 1, further comprising determining a sampling matrix associated with the reflectance function, wherein elements of the sampling matrix includes functions of view samples and light samples.

3. The graphics processing method as recited in claim 2, further comprising parameterizing the view samples and the light samples.

4. The graphics processing method as recited in claim 2, further comprising performing singular value decomposition (SVD) on the sampling matrix.

5. The graphics processing method as recited in claim 4, further comprising supersampling the view samples and light samples.

6. The graphics processing method as recited in claim 1, further comprising representing the source lighting as a cube map.

7. The graphics processing method as recited in claim 6, wherein the cube map is configured to represent source lighting with more than 1000 basis functions.

8. The graphics processing method as recited in claim 1, wherein the reflectance function is a bidirectional reflectance distribution function (BRDF).

9. The graphics processing method as recited in claim 1, further comprising determining a raw transfer matrix associated with the reflectance function, wherein the raw transfer matrix includes a directional lighting basis.

10. The graphics processing method as recited in claim 9, further comprising compressing the raw transfer matrix using a cluster analysis.

11. The graphics processing method as recited in claim 9, further comprising partitioning the transfer matrix into segments based on a cube map that represents the source lighting.

12. The graphics processing method as recited in claim 11, wherein each segment corresponds to a portion of a face of the cube map.

13. The graphics processing method as recited in claim 11, further comprising applying clustered principal component analysis (CPCA) to each segment of the raw transfer matrix to obtain the transfer matrix.

14. The graphics processing method as recited in claim 13, wherein applying the clustered principal component analysis (CPCA) is performed using an iterative method.

15. The graphics processing method as recited in claim 11, further comprising projecting a timevarying lighting environment on the cube map.

16. The graphics processing method as recited in claim 15, further comprising:
projecting the time-varying lighting environment into a Haar wavelet basis over each segment; and
obtaining a light vector.

17. The graphics processing method as recited in claim 13, further comprising:
transforming the source lighting through each cluster of the transform matrix; and
reconstructing a transferred radiance vector at each vertex of the object.

18. An apparatus for rendering real-time graphics comprising at least one processing unit configured to:
determine a bidirectional reflectance distribution function (BRDF) that represents reflectance of an object;
factor the BRDF into view direction functions and light direction functions;
determine a lighting basis that represents source lighting;
determining a transferred incidence radiance function that represents radiance from source lighting and that includes transport effects;
determine a precomputed radiance transfer (PRT) matrix based, at least in part, on light direction functions of the BRDF, the transferred incidence radiance function, and the lighting basis; and
compress the PRT matrix using clustered principal component analysis (CPCA).

19. The apparatus as recited in claim 18, wherein the lighting basis includes more than 1000 basis functions.

20. The apparatus as recited in claim 18, wherein the lighting basis is represented by a cube map.

21. The apparatus as recited in claim 20, wherein the lighting basis is determined based, at least in part, on applying Haar wavelets over blocks of the cube map.

22. The apparatus as recited in claim 18, wherein the at least one processor is further configured to partition the PRT matrix into segments.

23. The apparatus as recited in claim 22, wherein each segment is associated with a portion of a face of a cube map that represents the lighting basis.

24. The apparatus as recited in claim 22, wherein the at least one processor is further configured to approximate the segments of the PRT matrix as a linear combination of representatives.

25. The apparatus as recited in claim 18, wherein the CPCA is performed based, at least in part, on clustering points associated with the object and computing an independent approximation for each cluster.

26. The apparatus as recited in claim 18, wherein the BRDF is factored based, at least in part, by accounting for shadows.

27. The apparatus as recited in claim 18, wherein the at least one processor is further configured to:
determine a factoring matrix associated with the BRDF, the factoring matrix including view samples and lighting samples;
parameterize the view samples and lighting sampling;
operate a single value decomposition on the factoring matrix; and
apply the operated factoring matrix to determine the PRT matrix.

28. The apparatus as recited in claim 27, wherein parameterize the view samples and lighting sampling is performed based, at least in part, on a parabolic map.

29. The apparatus as recited in claim 18, further comprising multiple processing units configured to operate in parallel.

30. The apparatus as recited in claim 29, wherein the multiple processing units include at least one of a central processing unit or a graphics processing unit.

31. An apparatus comprising:
means for identifying a bidirectional reflectance distribution function (BRDF) that represents reflectance of an object to be rendered;
means for factoring the BRDF into light depending functions and view dependent functions;
means for determining a transferred incidence radiance function that represents radiance from source lighting and that includes transport effects;
means for generating a transfer matrix by integrating the factored light depending functions of the reflectance function and the transferred incidence radiance function;
means for representing a source lighting with basis functions;
means for identifying lighting coefficients of the lighting basis functions;

means for determining a shading function from the view dependent functions, the generated transfer matrix, and the lighting coefficients; and means for rendering the object based on the shading function.

32. The apparatus as recited in claim 31, further comprising means for representing the source lighting with a cube map.

33. The apparatus as recited in claim 31, further comprising means for arranging the PRT matrix such that rows of the matrix are associated with reflectance of the object.

34. The apparatus as recited in claim 31, further comprising means for arranging the PRT matrix such that columns of the matrix are associated with responses of the object to the source lighting.

35. The apparatus as recited in claim 31, further comprising means for partitioning the PRT matrix into segments.

36. The apparatus as recited in claim 35, further comprising means for compressing the segments using clustered principal component analysis (CPCA).

37. The apparatus as recited in claim 36, further comprising means for applying an iterative method to compress the segments using CPCA.

38. The apparatus as recited in claim 31, further comprising means for factoring the BRDF using a factoring matrix, wherein the factoring matrix includes view samples and light samples.

39. The apparatus as recited in claim 38, further comprising means for parameterizing the view and light samples using a parabolic map.

40. The apparatus as recited in claim 38, further comprising means for performing singular value decomposition on the factoring matrix.

41. The apparatus as recited in claim 38, further comprising means for including a cosine factor in factoring the BRDF.

42. The apparatus as recited in claim 38, further comprising means for applying a Haar wavelet transform to the PRT matrix in the light dimensions.

* * * * *